(12) United States Patent
Ochi (10) Patent No.: US 10,887,485 B2
(45) Date of Patent: Jan. 5, 2021

(54) IMAGE FORMING APPARATUS FOR FORMING IMAGE REPRESENTING EVACUATION INFORMATION EXPRESSED IN LANGUAGE RECOGNIZED BY SPEECH RECOGNITION FUNCTION

(71) Applicant: KYOCERA Document Solutions Inc., Osaka (JP)

(72) Inventor: Makoto Ochi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/724,687

(22) Filed: Dec. 23, 2019

(65) Prior Publication Data

US 2020/0213466 A1    Jul. 2, 2020

(30) Foreign Application Priority Data

Dec. 28, 2018    (JP) ................................ 2018-248502

(51) Int. Cl.
*H04N 1/00* (2006.01)
*G10L 15/22* (2006.01)
(Continued)

(52) U.S. Cl.
CPC ....... *H04N 1/00912* (2013.01); *G10L 15/005* (2013.01); *G10L 15/22* (2013.01); *H04N 1/00403* (2013.01); *H04N 1/00408* (2013.01); *H04N 1/333* (2013.01); *G10L 2015/223* (2013.01); *G10L 2015/225* (2013.01)

(58) Field of Classification Search
CPC .......... H04N 1/00408; H04N 1/00914; H04N 1/00403
See application file for complete search history.

(56) References Cited

U.S. PATENT DOCUMENTS 6,006,045 A * 12/1999 Miyawaki .......... G03G 15/5079
399/79
2004/0080497 A1* 4/2004 Enmei ................... G06F 1/1616
345/174

(Continued)

FOREIGN PATENT DOCUMENTS

JP    2003-044074 A    2/2003
JP    2003044074 A *   2/2003

*Primary Examiner* — Ted W Barnes
(74) *Attorney, Agent, or Firm* — IP Business Solutions, LLC (57) ABSTRACT

An image forming apparatus includes a speech input device, a display device, an image forming device, and a control device. The display device displays an image expressed in a preset language for display. The control device functions as a controller that operates in either one of a normal operating mode and an emergency operating mode and recognizes, based on a speech input to the speech input device, a language of the input speech. During operation in the normal operating mode, the controller recognizes a language of the speech input to the speech input device and sets the recognized language as the language for display. During operation in the emergency operating mode, the controller recognizes a language of the speech input to the speech input device and allows the image forming device to form an image representing evacuation information expressed in the recognized language.

8 Claims, 6 Drawing Sheets

(51) Int. Cl.
*G10L 15/00* (2013.01)
*H04N 1/333* (2006.01)

(56) References Cited

U.S. PATENT DOCUMENTS

| | | | |
|---|---|---|---|
| 2014/0293346 A1* | 10/2014 | Uchida | H04N 1/32106 358/1.15 |
| 2019/0149675 A1* | 5/2019 | Kodimer | G10L 15/22 358/1.13 |
| 2019/0306341 A1* | 10/2019 | Matysiak | G06F 3/167 |
| 2019/0349489 A1* | 11/2019 | Inagaki | G06F 3/1204 |
| 2020/0076969 A1* | 3/2020 | Ikeda | G06F 3/1258 |
| 2020/0084325 A1* | 3/2020 | Otake | H04N 1/00347 |
| 2020/0106895 A1* | 4/2020 | Okamura | G06F 3/167 |

* cited by examiner

IMAGE FORMING APPARATUS FOR FORMING IMAGE REPRESENTING EVACUATION INFORMATION EXPRESSED IN LANGUAGE RECOGNIZED BY SPEECH RECOGNITION FUNCTION

INCORPORATION BY REFERENCE

This application claims priority to Japanese Patent Application No. 2018-248502 filed on 28 Dec. 2018, the entire contents of which are incorporated by reference herein.

BACKGROUND

The present disclosure relates to image forming apparatuses and particularly relates to operation control of an image forming apparatus with a speech recognition function.

As a general technique, an image forming apparatus is known which has the function of recognizing the language of a user's speech utterance using a speech recognition technique.

For example, there is also known an output processing device that subjects a speech input by a user to speech recognition processing and, upon identification of a language used in the speech as a result of the speech recognition processing, switches from a language currently displayed on a display device to the identified language.

SUMMARY

A technique improved over the above techniques is proposed as one aspect of the present disclosure.

An image forming apparatus according to one aspect of the present disclosure includes a speech input device, a display device, an image forming device, and a control device. The speech input device is a device to which a speech is input. The display device displays an image expressed in a preset language for display. The image forming device forms an image on a recording medium. The control device includes a processor and functions, through the processor executing a control program, as a controller that operates in either one of a normal operating mode and an emergency operating mode and recognizes, based on a speech input to the speech input device, a language of the input speech. When the speech is input to the speech input device during operation of the controller in the normal operating mode, the controller recognizes a language of the speech input to the speech input device and sets the recognized language as the language for display. When the speech is input to the speech input device during operation of the controller in the emergency operating mode, the controller recognizes a language of the speech input to the speech input device and allows the image forming device to form an image representing evacuation information expressed in the recognized language.

DETAILED DESCRIPTION

Hereinafter, a description will be given of an image forming apparatus according to one embodiment of the present disclosure with reference to the drawings. The term "language" in this embodiment refers to a discrete language system, such as "Japanese" or "English".

Figure 1:
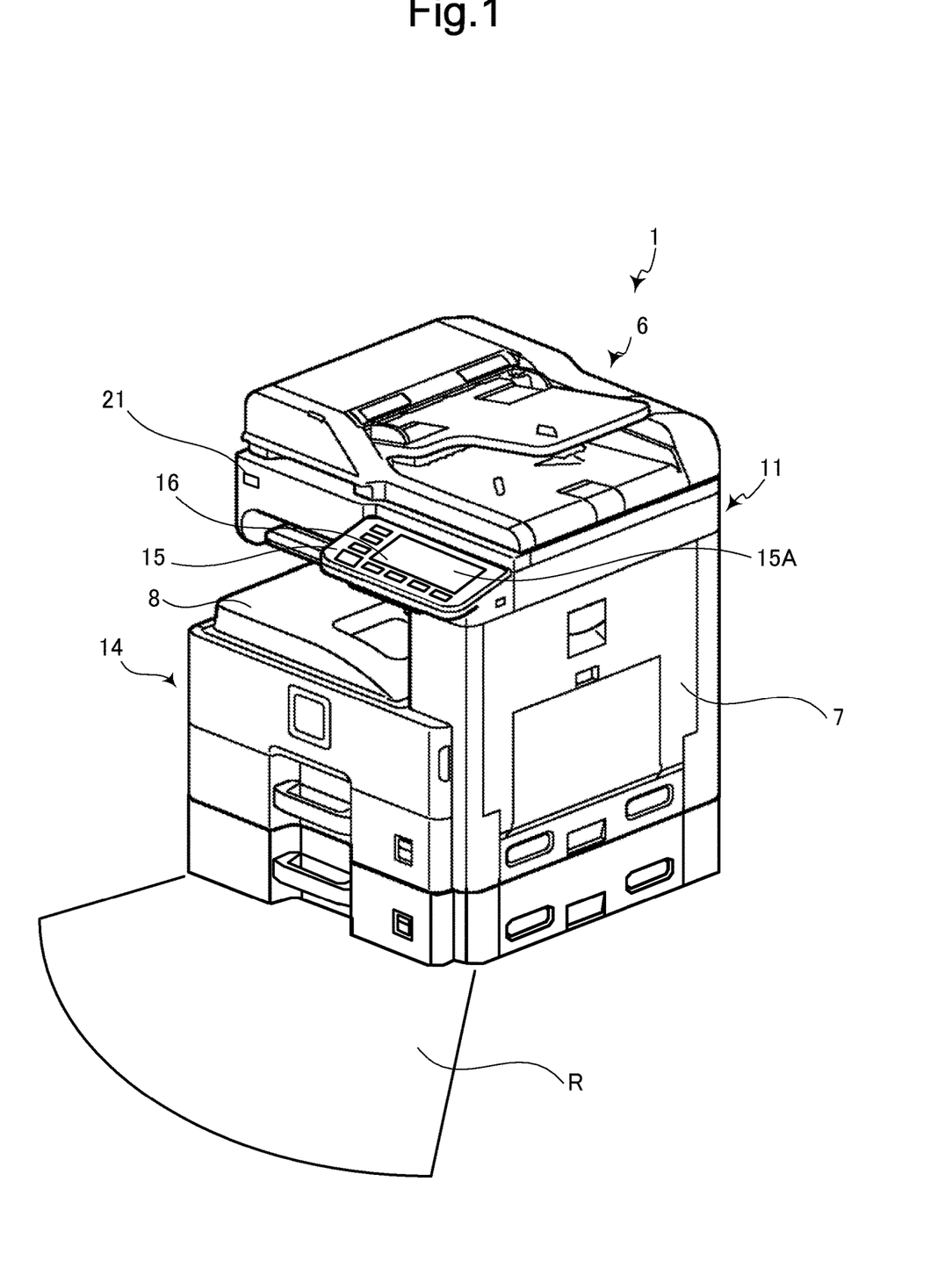
FIG. 1 is a perspective view showing the appearance of an image forming apparatus.
Figure 2:
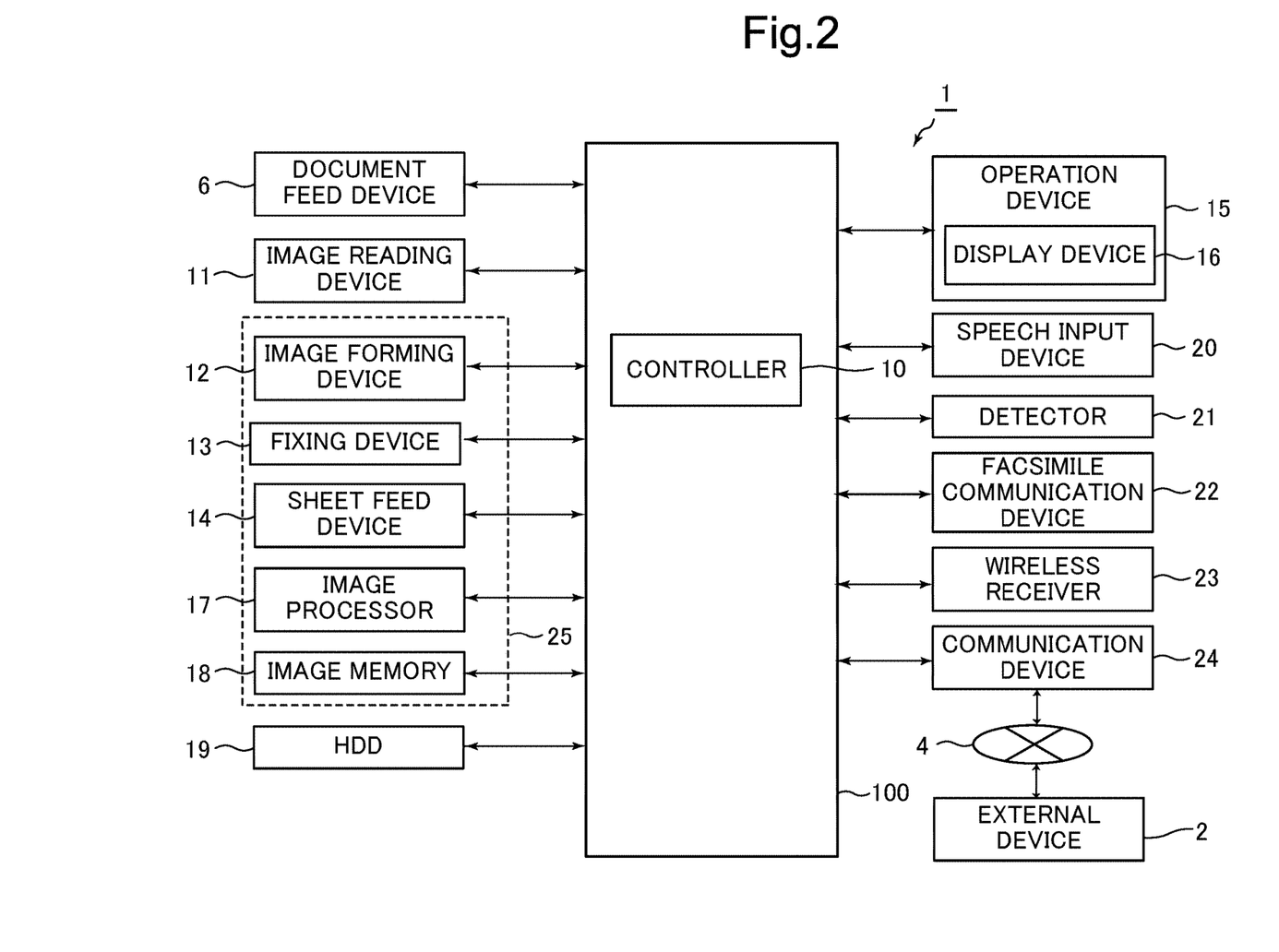
FIG. 2 is a block diagram showing an internal configuration of the image forming apparatus.

FIG. 1 is a perspective view showing the appearance of an image forming apparatus 1 according to one embodiment of the present disclosure. FIG. 2 is a block diagram showing an internal configuration of the image forming apparatus 1 according to the one embodiment of the present disclosure. With reference to FIGS. 1 and 2, a housing 7 of the image forming apparatus 1 contains a plurality of devices for implementing various functions of the image forming apparatus 1. For example, the housing 7 contains an image reading device 11, an image forming device 12, a fixing device 13, a sheet feed device 14, and so on.

The image reading device 11 is an ADF (auto document feeder) including: a document feed device 6 that feeds an original document; and a scanner that optically reads the original document being fed by the document feed device 6 or an original document placed on an original glass plate. The image reading device 11 irradiates the original document with light from a lighting part, receives light reflected from the original document on a CCD (charge-coupled device) sensor to read an image of the original document, and generates image data on the read image.

The image forming device 12 includes a photosensitive drum, a charging device, an exposure device, a developing device, and a transfer device. The image forming device 12 forms a toner image on a recording paper sheet fed from the sheet feed device 14, based on the image data generated by the image reading device 11, image data sent from an external device 2, such as a personal computer, connected thereto via a network connection 4, or other image data.

The fixing device 13 applies heat and pressure to a recording paper sheet having a toner image formed on its surface by the image formation processing of the image forming device 12, thus fixing the toner image on the recording paper sheet. After being subjected to the fixation by the fixing device 13, the recording paper sheet having an image formed thereon is discharged to a sheet output tray 8.

The sheet feed device 14 pulls out recording paper sheets contained in a sheet cassette or recording paper sheets put on a manual feed tray sheet by sheet with a pick-up roller and feeds forward the pulled-out recording paper sheet to the image forming device 12.

The image forming apparatus 1 includes an operation device 15 located near the image reading device 11 and on the front side of the image forming apparatus 1. Users can input through the operation device 15 instructions for various functions executable by the image forming apparatus 1.

The operation device 15 includes a display device 16. The display device 16 is a display device including a liquid crystal display. The display device 16 displays various screen images related to various functions executable by the image forming apparatus 1. The operation device 15 further includes a touch panel 15A superposed on the top of the display device 16.

The image forming apparatus 1 includes a speech input device 20 to which a speech utterance produced near the image forming apparatus 1 is to be input. The speech input device 20 includes: a microphone built in the operation device 15; and an A/D converter circuit that converts an analog signal based on a speech input to the microphone to a digital signal. No particular limitation is placed on the type of the microphone so long as it is commonly used. An example that can be used is a condenser microphone.

A detector 21 capable of detecting a person present near the image forming apparatus 1 is provided on the front side of the image forming apparatus 1. The detector 21 is a motion sensor. No particular limitation is placed on the type of the motion sensor so long as it is commonly used. An example that can be used is an infrared sensor. In this embodiment, the detector 21 detects a person present within an area R which is a detectable range of the detector 21.

The image forming apparatus 1 includes a control device 100. The control device 100 includes a processor, a RAM (random access memory), a ROM (read only memory), and so on. The processor is, for example, a CPU (central processing unit), an MPU (micro-processing unit) or an ASIC (application specific integrated circuit). When a control program stored in the above ROM or an HDD (hard disk drive) 19 built in the control device 100 is executed by the processor, the control device 100 functions as a controller 10. However, the controller 10 may not be realized by the operation in accordance with the control program, but may be formed of a hardware circuit. Alternatively, the controller 10 may be realized by two or more control devices.

The control device 100 is electrically connected to the document feed device 6, the image reading device 11, the image forming device 12, the fixing device 13, the sheet feed device 14, the operation device 15, an image processor 17, an image memory 18, the HDD 19, the speech input device 20, the detector 21, a facsimile communication device 22, a wireless receiver 23, a communication device 24, and so on. The image forming device 12, the fixing device 13, the sheet feed device 14, the image processor 17, and the image memory 18 function as an output device 25 that outputs an image by forming the image on a recording paper sheet.

The controller 10 governs the overall control of the image forming apparatus 1. More specifically, the controller 10 performs the operations of the devices constituting the image forming apparatus 1 and various types of processing, including communications with external devices 2, such as personal computers, connected via a network thereto.

The image processor 17 performs, as necessary, image processing of image data generated by the image reading device 11.

The image memory 18 includes a region for temporarily storing image data that has been generated by the image reading device 11 and may be output in the future.

The HDD 19 is a large storage device capable of storing various types of data, including image data generated by the image reading device 11. The HDD 19 holds various computer programs for implementing general operations of the image forming apparatus 1. The HDD 19 corresponds to a storage device defined in "What is claimed is".

The HDD 19 holds a recognition control program for use in applying, to a speech input to the speech input device 20, language recognition processing for recognizing the language of the input speech. The processor operates in accordance with the recognition control program to execute the language recognition processing as the controller 10. No particular limitation is placed on the type of the language recognition processing so long as it is commonly used. An example that can be used is language recognition processing to which a speech recognition technique employing a statistical method is applied. In this embodiment, the recognition control program is contained in the above-described control program for the processor.

The HDD 19 holds a switching control program for use in executing language switching processing according to this embodiment. The processor operates in accordance with the switching control program to execute the language switching processing as the controller 10. In this embodiment, the switching control program is contained in the above-described control program for the processor.

The HDD 19 previously stores language information showing a plurality of languages that can be displayed on the display device 16. The user can previously select and set one of the above plurality of language as a language for use in display on the display device 16 (hereinafter, referred to as a "language for display"). In this embodiment, the HDD 19 previously stores, as the language information, information showing English, Japanese, Chinese, Spanish, French, Korean, and Thai.

Each image being displayed on the display device 16 (hereinafter, referred to as a "display image") contains a text portion representing, for example, a message, and a parts portion which is a portion other than the text portion and represents, for example, soft keys. The HDD 19 previously stores, for each display image, respective pieces of text image data corresponding to the text portions expressed in the individual languages shown by the language information. The HDD 19 also previously stores, for each display image, a piece of parts image data corresponding to the parts portion. The HDD 19 also previously stores, for each of the pieces of text image data and the piece of parts image data, coordinate information showing the layout positions of elements in the display image. The controller 10 generates image data for displaying each display image, using the piece of text image data for the set language for display, the piece of parts image data, and the coordinate information.

In this embodiment, the controller 10 operates in either one of a normal operating mode and an emergency operating mode. During operation in the normal operating mode, the controller 10 allows the HDD 19 to store, as history information, information showing all languages recognized based on speeches input to the speech input device 20. The history information is updated each time when, during operation in the normal operating mode, the language of a speech input to the speech input device 20 is recognized.

The HDD 19 previously stores, for each individual one of the plurality of languages shown by the language information, image data corresponding to an image representing evacuation information expressed in the individual language. The evacuation information contains information showing at least one of an evacuation place near the location where the image forming apparatus 1 is placed (hereinafter, referred to as "the present location") and an evacuation route providing a path from the present location to the evacuation place. The evacuation information may also contain information showing a map of the area around the present location. Hereinafter, the above image representing evacuation information is referred to as a "map image" and the above image data is referred to as a "map data". The map data is previously generated by an administrator or the like of the image forming apparatus 1 and previously stored on the HDD 19.

The facsimile communication device 22 performs connection to a public line and transfers image data to and from other facsimile devices via the public line.

The wireless receiver 23 receives disaster prevention information sent from a control office or the like established in a municipality or the like. No particular limitation is placed on the type of the wireless receiver 23 so long as it has the same structure as one commonly used as a receiver for a disaster prevention administrative radio system. The wireless receiver 23 includes: an antenna that receives radio waves sent by wireless communication, for example, from the control office or the like; and an A/D converter circuit that converts an analog signal based on radio waves input to the antenna to a digital signal to generate digital data indicating disaster prevention information (hereinafter, referred to as "disaster prevention data"); and so on.

When the disaster prevention data received through the wireless receiver 23 contains information showing at least one of an evacuation advisory and an evacuation order, the controller 10 makes the transition from the normal operating mode to the emergency operating mode.

The communication device 24 includes a communication module, such as a LAN (local area network) board. The image forming apparatus 1 performs data communications through the communication device 24 with the external devices 2, such as personal computers, connected thereto via the network connection 4.

Each of the devices constituting the image forming apparatus 1 is connected to a power supply and operates on electric power supplied from the power supply.

[Operations]

Figure 3:
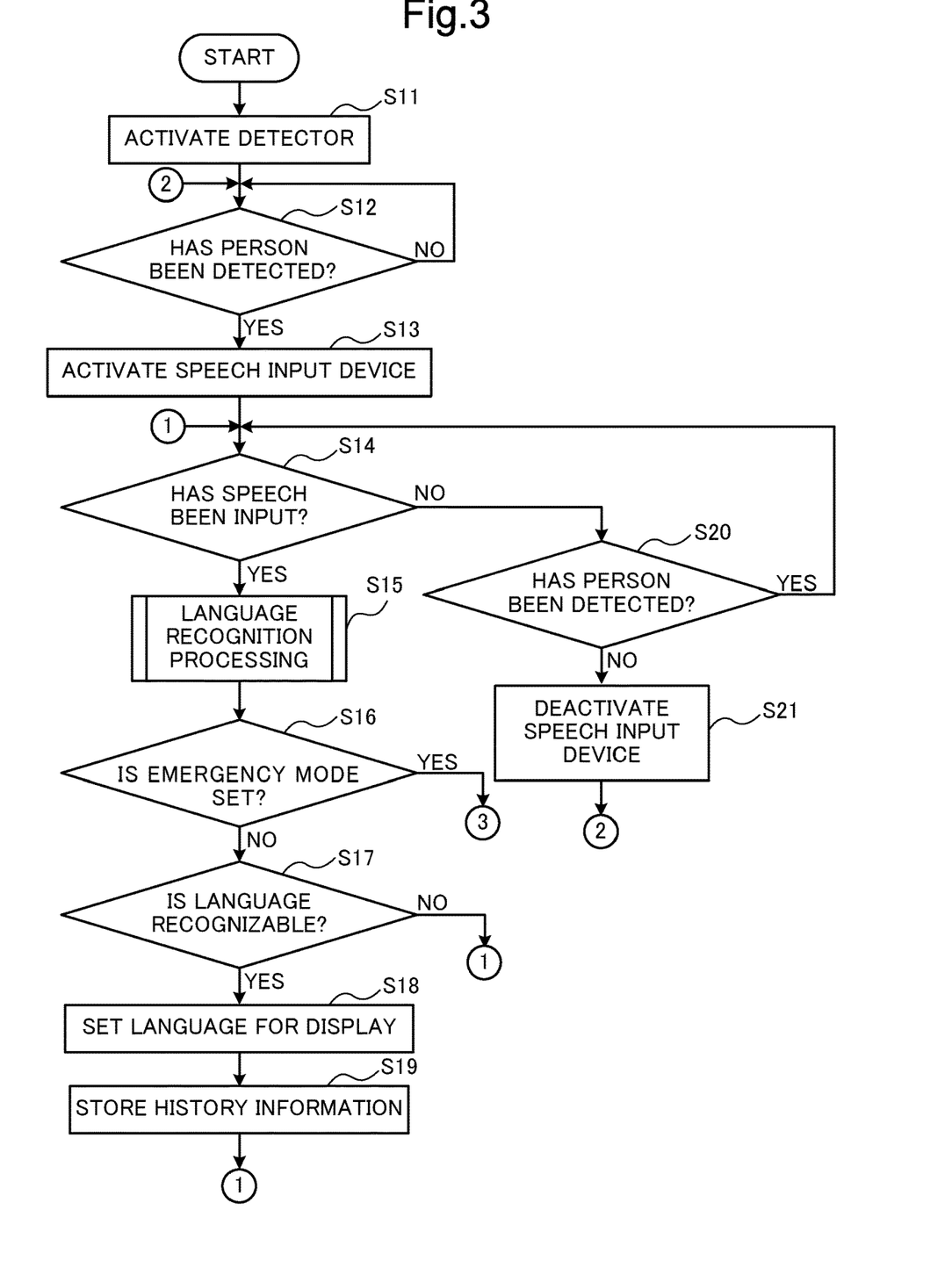
FIG. 3 is a flowchart showing language switching processing.
Figure 4:
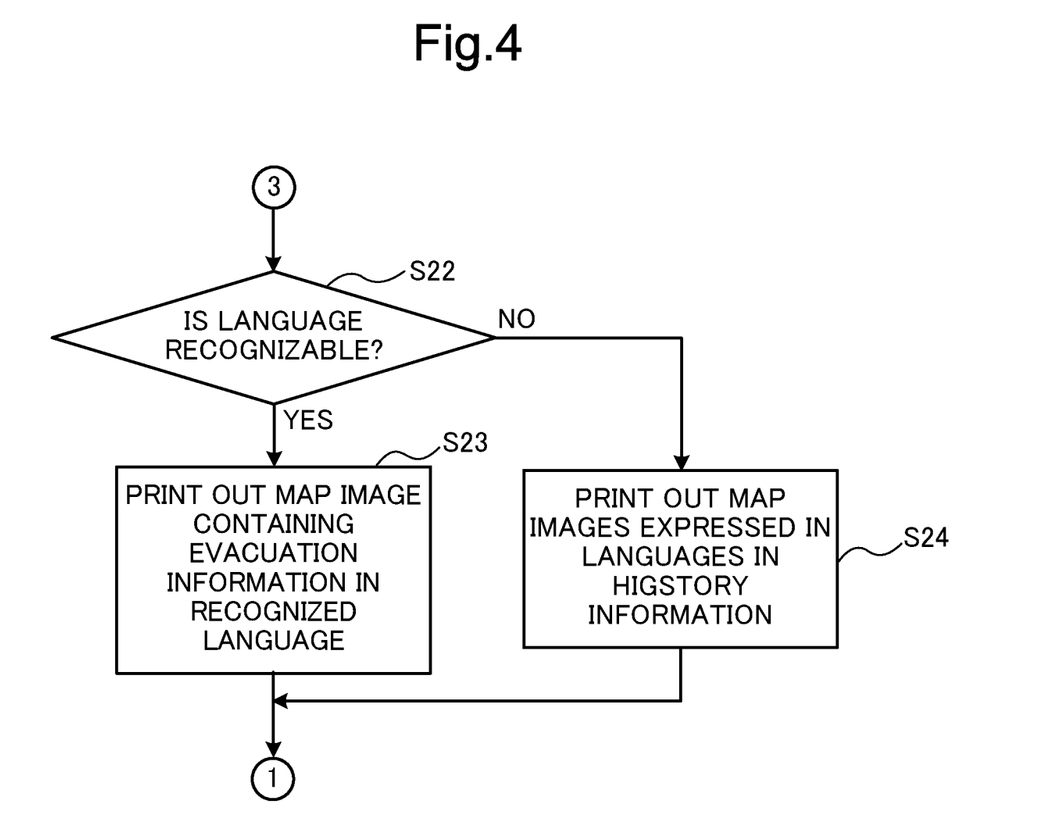
FIG. 4 is a flowchart showing the language switching processing.

FIGS. 3 and 4 show a flowchart showing the language switching processing. A description will be given below of the control structure of the above-mentioned switching control program to be executed on the image forming apparatus 1 in order to execute the language switching processing, together with an operation of the image forming apparatus 1. The switching control program is performed on power-on of the image forming apparatus 1 and terminated on power-off of the image forming apparatus 1.

In the following description, it is assumed that the controller 10 has the capability to perform the language recognition processing and thus recognize, as the language of a speech input to the speech input device 20, one of the plurality of languages shown by the language information.

The controller 10 previously sets, for example, "Chinese" as a language for display in accordance with an instruction input through the operation device 15 by a first user using Chinese. In this case, the controller 10 allows the display device 16 to display various display images expressed in "Chinese" until the language for display is set to a different language other than "Chinese".

Referring to FIG. 3, when the image forming apparatus 1 is powered on, the controller 10 activates the detector 21 (step S11) and waits until the detector 21 detects a person present near the image forming apparatus 1 (NO in step S12).

(1) Case of Normal Operating Mode

At power-on of the image forming apparatus 1, the operating mode of the controller 10 is set to the normal operating mode. Therefore, in this case, the controller 10 is operating in the normal operating mode. During operation in the normal operating mode, the controller 10 can perform various functions that the image forming apparatus 1 has.

Suppose that in this situation, for example, a second user using Japanese approaches the front of the image forming apparatus 1 and enters the area R. When the second user present in the area R is detected by the detector 21, the controller 10 determines that a person present in the area R has been detected (YES in step S12), and activates the speech input device 20 (step S13).

Suppose that the second user then stands in front of the image forming apparatus 1 and has uttered "Syuturyoku shitai" in Japanese. The controller 10 determines that a speech has been input to the speech input device 20 (YES in step S14), and applies the language recognition processing to the input speech (step S15).

Specifically, the controller 10 uses a speech recognition technique based on a commonly used statistical method to extract from the input speech, for example, a word "Syuturyoku" and recognize, based on the extracted word, the language of the input speech. In this case, the controller 10 recognizes "Japanese" as the language of the input speech.

After the execution of the language recognition processing, the controller 10 determines that the emergency operating mode is currently not set (NO in step S16), determines that the language of the input speech can be recognized (YES in step S17), and sets as the language for display the language recognized by the language recognition processing (step S18). In this case, the controller 10 sets as the language for display "Japanese" instead of "Chinese". After the setting of the language for display, the controller 10 allows the display device 16 to display various display images expressed in "Japanese" until the language for display is set to a different language other than "Japanese".

After the setting of the language for display, the controller 10 allows the HDD 19 to store, as history information, information showing the language recognized by the language recognition processing (step S19). Thus, the information showing "Japanese" is added to the history information and the updated history information is stored on the HDD 19. After the updating of the history information, the controller 10 waits until the next time a speech is input to the speech input device 20 or until there is no person present in the area R who is detected by a signal acquired from the detector 21 (NO in step S14 and YES in step S20).

On the other hand, if the language of the input speech cannot be recognized, for example, because the speech utterance provided by the second user is unclear, the controller 10 determines that the language of the input speech cannot be recognized (NO in step S17), and waits until the next time a speech is input to the speech input device 20 or until there is no person present in the area R who is detected by a signal acquired from the detector 21 (NO in step S14 and YES in step S20).

When the second user moves away from the front of the image forming apparatus 1 and outside the area R, the second user who was present in the area R is no longer detected by the detector 21. In this case, the controller 10 determines that there is no person present in the area R who is detected by a signal acquired from the detector 21 (NO in step S20), and deactivates the speech input device 20 (step S21). After the deactivation of the speech input device 20, the controller 10 waits again until the detector 21 detects a person present near the image forming apparatus 1 (NO in step S12).

(2) Case of Emergency Operating Mode

Suppose that, owing to heavy rains, a river bank has been breached and overflowed and the mayor of municipality has issued an evacuation order. For example, the control office in the municipality building or the like broadcasts disaster prevention information containing the evacuation order using a disaster prevention administrative radio system. When the antenna of the wireless receiver 23 receives radio waves broadcast from the control office, the A/D converter circuit converts an analog signal based on the input radio waves to a digital signal to generate disaster prevention data.

The controller 10 analyzes the disaster prevention data. When, as a result of the analysis, the controller 10 determines that the disaster prevention data contains information showing an evacuation order, it makes the transition from the normal operating mode to the emergency operating mode. During operation in the emergency operating mode, the controller 10 allows the image forming apparatus 1 to perform various functions that the image forming apparatus 1 has. However, when a speech is input to the speech input device 20, the controller 10 stops processing being executed and enables the execution of an interrupt task to be described later.

After the transition of the operating mode, the controller 10 is operating in the emergency operating mode. Suppose that in this situation, for example, a third user using English approaches the front of the image forming apparatus 1 and enters the area R. When the third user present in the area R is detected by the detector 21, the controller 10 determines that a person present in the area R has been detected (YES in step S12), and activates the speech input device 20 (step S13).

Suppose that the third user then stands in front of the image forming apparatus 1 and has uttered "An evacuation order has been issued." in English. The controller 10 determines that a speech has been input to the speech input device 20 (YES in step S14), and applies the language recognition processing to the input speech (step S15).

Specifically, the controller 10 uses a speech recognition technique based on a commonly used statistical method to extract from the input speech, for example, a word "evacuation" and recognize, based on the extracted word, the language of the input speech. In this case, the controller 10 recognizes "English" as the language of the input speech.

After the execution of the language recognition processing, the controller 10 determines that the emergency operating mode is currently set (YES in step S16). Subsequently, as shown in FIG. 4, the controller 10 determines that the language of the input speech can be recognized (YES in step S22), and allows the output device 25 to output a map image representing evacuation information expressed in the language recognized by the language recognition processing (step S23).

Specifically, the controller 10 reads from the HDD 19 map data for the language recognized by the language recognition processing and allows the output device 25 to form on a recording paper sheet a map image corresponding to the read map data. If there is any processing currently being executed, the controller 10 forcibly stops the processing currently being executed and executes the task of outputting the map image as an interrupt task.

For example, if the controller 10 is in the middle of allowing the output device 25 to output a different image other than the map image, the controller 10 allows the output device 25 to stop the output of the other image and output the map image. After the output of the map image, the interrupted processing is restarted.

Figure 5:
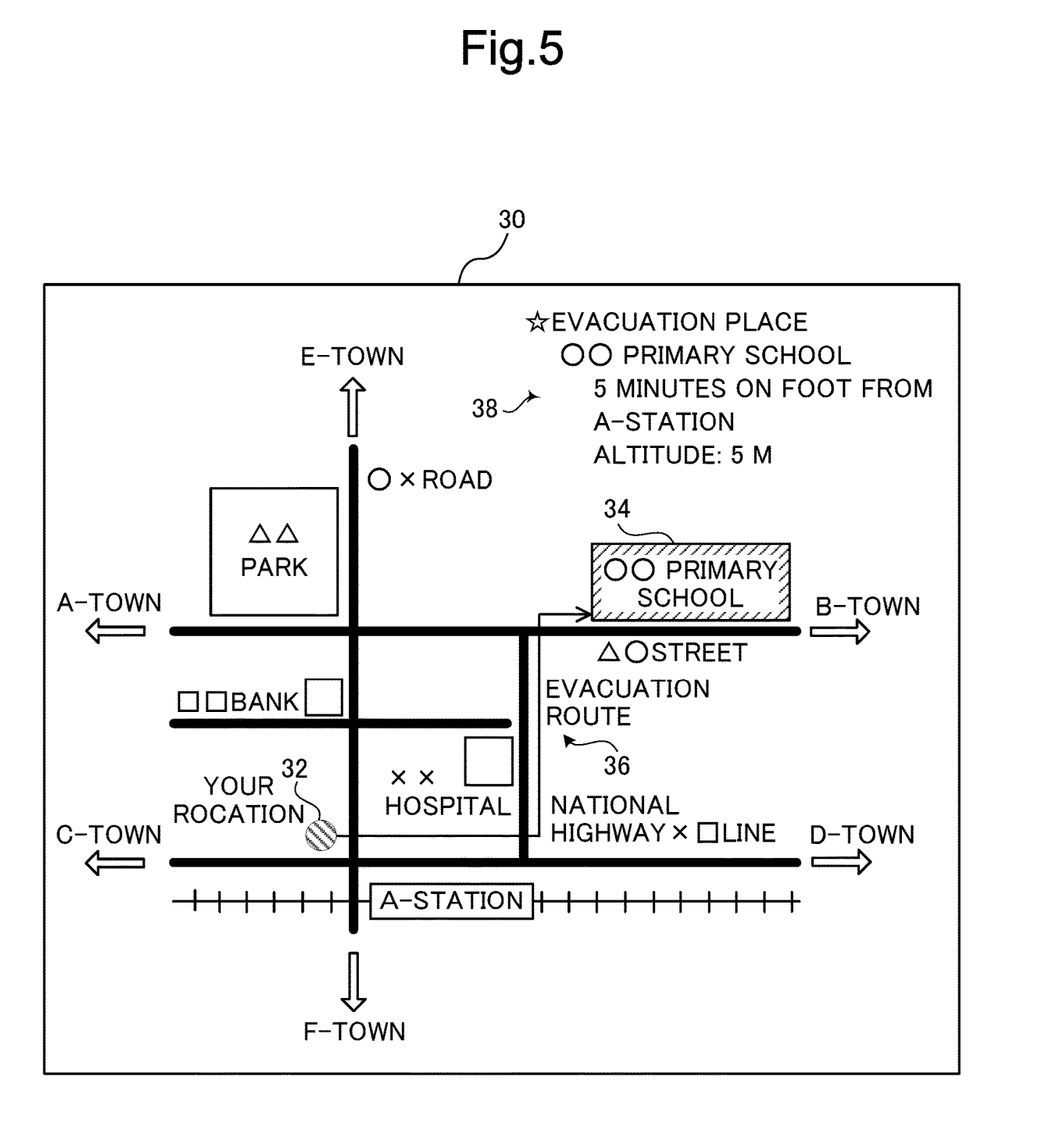
FIG. 5 is a diagram showing an example of a map image expressed in English.

FIG. 5 is a diagram showing an example of a map image expressed in English. Referring to FIG. 5, the map image 30 is an example of a map of the area around the present location (YOUR LOCATION) 32, the map showing the present location 32, an evacuation place 34 near the present location 32, and an evacuation route 36 providing a path from the present location 32 to the evacuation place 34. The map image 30 also contains information 38 about the evacuation place 34. All information elements contained in the map image 30 and expressed in letters are expressed in "English".

After the output of the map image 30, the controller 10 waits until when a next speech is input to the speech input device 20 or until there is no person present in the area R who is detected by a signal acquired from the detector 21 (NO in step S14 and YES in step S20).

On the other hand, if the language of the input speech cannot be recognized, for example, because the speech utterance provided by the third user is unclear, the controller 10 determines that the language of the input speech cannot be recognized (NO in step S22), and allows the output device 25 to output respective map images containing evacuation information expressed in all individual languages shown by the history information (step S24). In this case, the history information contains information showing "Japanese", "Korean", "Chinese", "English", and "Thai".

Specifically, the controller 10 reads from the HDD 19 respective types of map data for all individual languages shown by the history information and allows the output device 25 to form on recording paper sheets respective map images corresponding to all the individual types of map data read from the HDD 19. If there is any processing currently being executed, the controller 10 forcibly stops the processing and executes the task of outputting the map images as an interrupt task. After the output of the map images, the interrupted processing is restarted.

Figure 6:
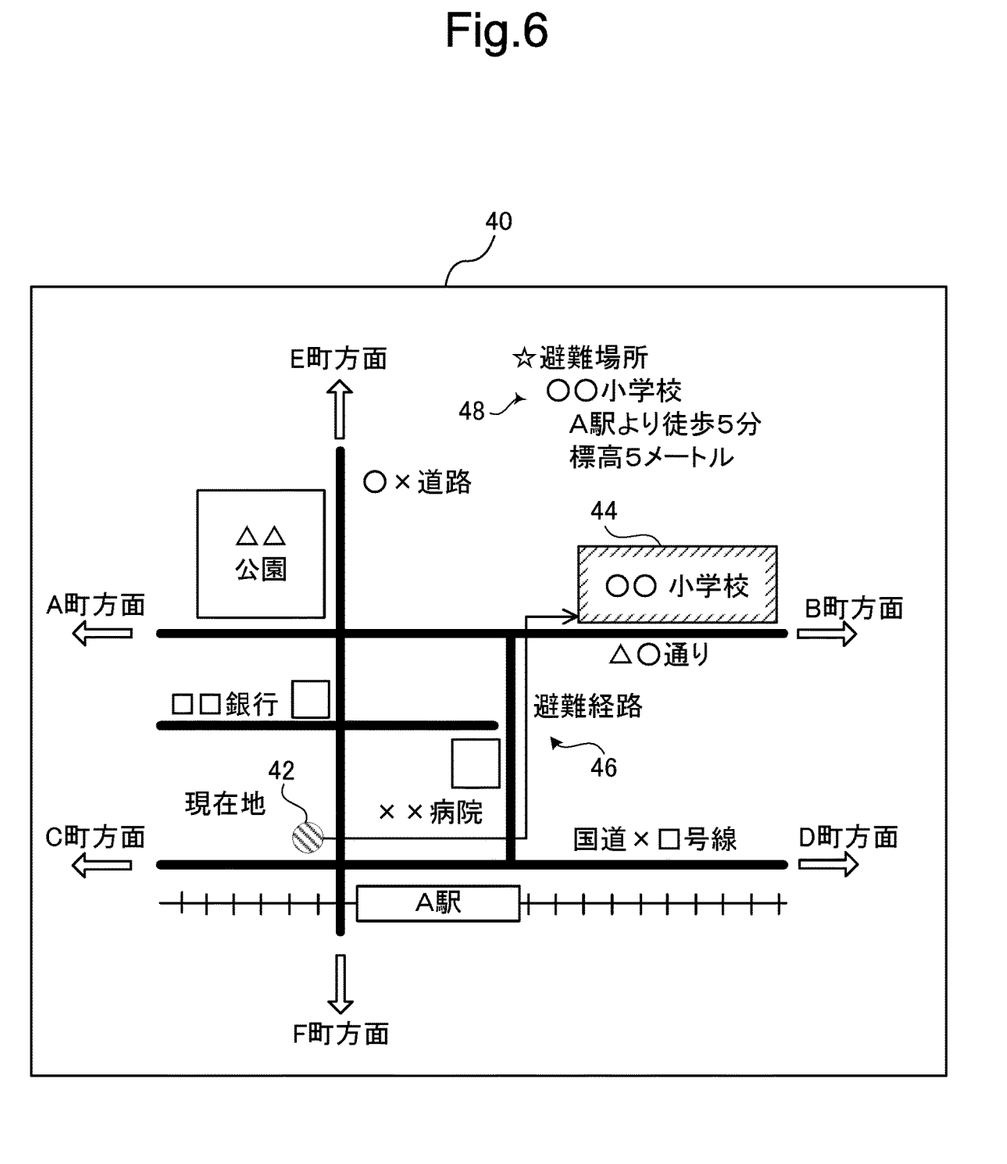
FIG. 6 is a diagram showing an example of a map image expressed in Japanese.

FIG. 6 is a diagram showing an example of a map image expressed in Japanese. Referring to FIG. 6, the map image 40 is an example of a map of the area around the present location 42, the map showing the present location 42, an evacuation place 44 near the present location 42, and an evacuation route 46 providing a path from the present location 42 to the evacuation place 44. The map image 40 also contains information 48 about the evacuation place 44. All information elements contained in the map image 40 and expressed in characters are expressed in "Japanese".

After the output of the map image 40, the controller 10 waits until when a next speech is input to the speech input device 20 or until there is no person present in the area R who is detected by a signal acquired from the detector 21 (NO in step S14 and YES in step S20).

In case of an emergency, such as during a disaster, users have to quickly obtain evacuation information about an evacuation place near where the users are, an evacuation route to the evacuation place, and so on.

However, travelers from abroad and like users are unfamiliar with the geography around and the locality of the disaster area, which presents a problem that they have difficulty in obtaining evacuation information. Furthermore, there is a problem that, even if they have access to evacuation information, they cannot fully understand the evacuation information expressed in Japanese, which prevents their smooth refuge.

The technique used in the previously described general image forming apparatus is one designed for use during normal times and therefore cannot deal with the above problems.

Unlike the above technique, according to the above embodiment, when a speech is input to the speech input device 20 during operation of the controller 10 in the emergency operating mode, the controller 10 recognizes the language of the speech input to the speech input device 20 and allows the output device 25 to output a map image 30 representing evacuation information expressed in the recognized language.

Thus, when the controller 10 is operating in the emergency operating mode, each user can obtain evacuation information expressed in a language that the user speaks, simply by performing a speech production action. Therefore, in case of an emergency, such as during a disaster, the user can quickly obtain evacuation information expressed in an understandable language.

Furthermore, according to the above embodiment, when operating in the normal operating mode, the controller 10 allows the HDD 19 to store, as history information, information showing all languages recognized based on speeches input to the speech input device 20. In addition, when the controller 10 fails to recognize the language of a speech input to the speech input device 20 while the image forming apparatus 1 operates in the emergency operating mode, the controller 10 allows the output device 25 to output respective map images representing evacuation information expressed in all the individual languages shown by history information.

Thus, even when the controller 10 cannot recognize the language of a speech utterance provided by a user, the user can obtain evacuation information expressed in a language that the user is highly likely to use. Therefore, in case of an emergency, such as during a disaster, the user can quickly obtain evacuation information expressed in a language highly likely to be understandable to the user.

Moreover, according to the above embodiment, when the controller 10 receives disaster prevention information through the wireless receiver 23 during operation in the normal operating mode, the controller 10 makes the transition from the normal operating mode to the emergency operating mode.

Thus, when disaster prevention information is broadcast, the transition to the emergency operating mode is made in time, so that users can more quickly obtain evacuation information. Therefore, user convenience can be further increased.

In addition, according to the above embodiment, the controller 10 allows the output device 25 to output a map image 30, 40 containing, as evacuation information, information showing at least one of an evacuation place 34, 44 and an evacuation route 36, 46. Therefore, in case of an emergency, such as during a disaster, the user can smoothly evacuate.

First Modification

The structure of the image forming apparatus 1 according a first modification of the present disclosure is the same as that of the image forming apparatus 1 according to the above embodiment, except mainly for a difference in the structure of the operation device 15. A description will be given below of differences from the above embodiment.

The operation device 15 further includes, as a hard key, a transition key through which an instruction to allow the image forming apparatus 1 to make the transition from the normal operating mode to the emergency operating mode is to be input.

[Operations]

Hereinafter, a description will be given of operations of the image forming apparatus 1 according to the first modification, but a repetitive description of the same operations as in the above embodiment will not be given.

Suppose that, owing to heavy rains, a river bank is highly likely to be breached and overflowed and the mayor of municipality has issued an evacuation preparedness advisory. For example, the control office in the municipality building or the like broadcasts disaster prevention information containing the evacuation preparedness advisory using a disaster prevention administrative radio system. When the antenna of the wireless receiver 23 receives radio waves broadcast from the control office, the A/D converter circuit converts an analog signal based on the input radio waves to a digital signal to generate disaster prevention data.

The controller 10 analyzes the disaster prevention data. When, as a result of the analysis, the controller 10 determines that the disaster prevention data contains neither information showing an evacuation advisory nor information showing an evacuation order, it maintains the normal operating mode. In this case, a user notified of the issuance of an evacuation preparedness advisory desires the transition of the image forming apparatus 1 to the emergency operating mode and presses the above transition key of the operation device 15.

When the transition key is pressed, the controller 10 determines that it has accepted an instruction to make the transition to the emergency operating mode, and makes the transition from the normal operating mode to the emergency operating mode.

According to the first modification, when, during operation in the normal operating mode, the controller 10 accepts through the operation device 15 an instruction to make the transition to the emergency operating mode, the controller 10 makes the transition from the normal operating mode to the emergency operating mode. Thus, even without transition to the emergency operating mode in response to the wireless receiver 23 having received disaster prevention information, the transition to the emergency operating mode can be made in response to a user's operation. Therefore, users can more certainly obtain evacuation information, which further increases user convenience.

Second Modification

The structure of the image forming apparatus 1 according a second modification of the present disclosure is the same as that of the image forming apparatus 1 according to the above embodiment, except mainly that the controller 10 and the speech input device 20 function as a sound detector that detects generation of an alarm. A description will be given below of differences from the above embodiment.

The HDD 19 previously stores sound data for use in recognizing an alarm of an emergency bell. When a sound is input to the speech input device 20, the controller 10 determines, based on the sound data stored on the HDD 19, whether or not the input sound is an alarm. The term alarm herein refers to a sound generated in order to call users' attention. No particular limitation is placed on the type of the alarm so long as it is commonly used. Examples include a sound of an emergency bell and a sound of the J-ALERT.

[Operations]

Hereinafter, a description will be given of operations of the image forming apparatus 1 according to the second modification, but a repetitive description of the same operations as in the above embodiment will not be given.

Suppose that, owing to heavy rains, a river bank is highly likely to be breached and overflowed and the mayor of municipality has issued an evacuation preparedness advisory. For example, the control office broadcasts disaster prevention information containing the evacuation preparedness advisory using a disaster prevention administrative radio system. Like the first modification, the controller 10 maintains the normal operating mode. In this case, a user notified of the issuance of an evacuation preparedness advisory activates an emergency bell, thus causing the emergency bell to sound an alarm.

When an alarm of the emergency bell is input to the speech input device 20, the controller 10 applies the above-mentioned speech recognition processing to the alarm sound and determines, based on the sound data stored on the HDD 19, whether or not the input sound is an alarm. When determining that the input sound is an alarm, i.e., detecting generation of an alarm, the controller 10 makes the transition from the normal operating mode to the emergency operating mode.

When the controller 10 cannot recognize which language the input sound belongs to by the above speech recognition processing and determines that the input sound is not an alarm, the controller 10 maintains the normal operating mode.

According to the second modification, when, during operation in the normal operating mode, an alarm of an emergency bell is input to the speech input device 20 and the controller 10 detects generation of the alarm, the controller 10 makes the transition from the normal operating mode to the emergency operating mode. Thus, even without transition to the emergency operating mode in response to the wireless receiver 23 having received disaster prevention information, the transition to the emergency operating mode can be made in response to a user's operation. Therefore, users can more certainly obtain evacuation information, which further increases user convenience.

Other Modifications

Although in the above embodiment the wireless receiver 23 functions as a receiver that receives disaster prevention information, the receiver that receives disaster prevention information in the present disclosure is not limited to the wireless receiver. For example, the communication device 24 may function as the receiver that receives disaster prevention information. In this case, the communication device 24 receives, through the network connection 4, disaster prevention data sent from a server or the like installed in a municipality building, the Fire and Disaster Management Office, the Meteorological Office, or so on.

Furthermore, in the above embodiment, when disaster prevention data contains information showing at least one of an evacuation advisory and an evacuation order, the controller 10 makes the transition from the normal operating mode to the emergency operating mode. However, the transition to the emergency operating mode in the present disclosure is not limited to the above case. For example, the controller 10 may be configured to make the transition from the normal operating mode to the emergency operating mode every time it has received any disaster prevention data, regardless of the contents of information contained in the disaster prevention data.

Although in the above embodiment the task of outputting a map image is executed after processing being currently executed is forcibly stopped, the time to execute the task of outputting a map image in the present disclosure is not limited to the above. For example, the task of outputting a map image may be executed after processing being currently executed is completed.

Although in the above embodiment the controller 10 enables the image forming apparatus 1 to perform its various functions even after the transition to the emergency operating mode, what type of function the image forming apparatus 1 can perform after the transition to the emergency operating mode in the present disclosure is not particularly limited. For example, after the transition to the emergency operating mode, the controller 10 may disable all types of processing except for the language switching processing according to the above embodiment.

In the above embodiment, the controller 10 may be further configured to make the transition from the emergency operating mode to the normal operating mode, for example, when it accepts through the operation device 15 an instruction to terminate the emergency operating mode.

Although, in the above embodiment, in the language switching processing during the emergency operating mode, only the task of outputting a map image is executed, the type of task to be executed during the emergency operating mode in the present disclosure is not limited to the above task. For example, during the emergency operating mode, not only the task of outputting a map image but also the task of setting as the language for display a language recognized by the language recognition processing may be executed.

Although in the above embodiment only one type of map data is stored on the HDD 19, the type of map data stored on the HDD or the like in the present disclosure is not limited to that in the above embodiment. For example, various types of map data may be stored on the HDD 19 depending on the type of disaster, such as flood disaster, earthquake, and large-scale fire. In this case, for each type of map data, respective pieces of map data for the individual languages shown by the language information are generated and stored on the HDD 19.

Although in the above embodiment the map image represents a map of the area around the present location, the type of map image in the present disclosure is not limited to the above. For example, the map image may represent, for example, an evacuation route map in a building where the image forming apparatus 1 is placed. The evacuation route map is output in case of a localized accident, such as in case of fire in the building where the image forming apparatus 1 is placed. In the case of such a localized accident, no disaster prevention information is broadcast via a disaster prevention administrative radio system. Therefore, the transition to the emergency operating mode as described in the first and second modifications is performed.

Although in the above embodiment map data corresponding to a map image is previously stored on the HDD 19, how to obtain the map data in the present disclosure is not limited to the above. For example, in outputting a map image, the controller 10 may acquire, through the communication device 24, evacuation information sent from a server or the like installed in a municipality building, the Fire and Disaster Management Office, the Meteorological Office, or so on, and information representing a map of the area around the image forming apparatus 1, and generate map data based on these acquired information. In this case, the controller 10 translates, in accordance with a commonly used translation program, text information contained in the acquired evacuation information into a language recognized by the language recognition processing.

Although in the above embodiment only one sheet of each type of map image is output, the number of output sheets of map images in the present disclosure is not limited to one. The number of output sheets of map images is not particularly limited and may be appropriately selected according to the number of users of the image forming apparatus 1 in the normal operating mode.

Although in the above embodiment the output device 25 forms an image on a recording paper sheet, the type of recording medium on which an image is formed in the present disclosure is not limited to the recording paper sheet. The output device 25 may form an image on various other types of recording media. An example of another type of recording medium is an OHP (overhead project) sheet.

Although in the above second modification the controller 10 and the speech input device 20 function as a sound detector, how to detect alarm generation in the present disclosure is not limited to the above. For example, the controller 10 may be electrically connected via electrical wiring or the like to an emergency bell and may electrically detect the activation of the emergency bell to thus detect generation of an alarm.

The present disclosure is not limited to the above embodiment and modifications and can be modified in various ways. For example, although in the above embodiment a multicolor multifunction peripheral is used as an example of the image forming apparatus according to the present disclosure, the example is merely illustrative and any other image forming apparatus, such as a black-and-white multifunction peripheral or other electronic apparatus, including a printer, a copier, and a facsimile machine, may be used.

Furthermore, the structure, configuration, and processing shown in the above embodiment with reference to FIGS. 1 to 6 are merely illustrative of the present disclosure and not intended to limit the present disclosure to the above particular structure, configuration, and processing.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
a speech input device to which a speech is to be input;
a display device that displays an image expressed in a preset language for display;
an image forming device that forms an image on a recording medium; and
a control device that includes a processor and functions, through the processor executing a control program, as a controller that operates in either one of a normal operating mode and an emergency operating mode and recognizes, based on a speech input to the speech input device, a language of the input speech,
wherein when the speech is input to the speech input device during operation of the controller in the normal operating mode, the controller recognizes a language of the speech input to the speech input device and sets the recognized language as the language for display, and
when the speech is input to the speech input device during operation of the controller in the emergency operating mode, the controller recognizes a language of the speech input to the speech input device and allows the image forming device to form an image representing evacuation information expressed in the recognized language,
the image forming apparatus further comprising a storage device,
wherein, during operation in the normal operating mode, the controller allows the storage device to store information showing all languages recognized based on speeches input to the speech input device, and
when, during operation in the emergency operating mode, the controller fails to recognize a language of the speech input to the speech input device, the controller allows the image forming device to form respective images representing evacuation information expressed in all the individual languages shown by the information stored in the storage device.

2. The image forming apparatus according to claim 1, further comprising a receiver that receives disaster prevention information,
wherein when, during operation in the normal operating mode, the controller receives the disaster prevention information through the receiver, the controller makes a transition from the normal operating mode to the emergency operating mode.

3. The image forming apparatus according to claim 2, wherein when, during operation in the normal operating mode, the controller receives the disaster prevention information through the receiver and the received disaster prevention information contains predetermined information, the controller makes the transition from the normal operating mode to the emergency operating mode.

4. The image forming apparatus according to claim 1, further comprising a hard key through which an instruction to allow the image forming apparatus to make a transition from the normal operating mode to the emergency operating mode is to be input,
wherein when, during operation in the normal operating mode, the hard key is pressed, the controller makes the transition from the normal operating mode to the emergency operating mode.

5. The image forming apparatus according to claim 1, further comprising a sound detector that detects generation of an alarm,
wherein when, during operation in the normal operating mode, the sound detector detects generation of the alarm, the controller makes a transition from the normal operating mode to the emergency operating mode.

6. The image forming apparatus according to claim 1, wherein the controller allows the image forming device to form the image containing, as the evacuation information, information showing at least one of an evacuation place and an evacuation route leading to the evacuation place.

7. The image forming apparatus according to claim 1, wherein when, during operation in the emergency operating mode, a speech is input to the speech input device, the controller allows the image forming device to form the image representing the evacuation information and sets the recognized language as the language for display.

8. The image forming apparatus according to claim 1, wherein when, during operation in the emergency operating mode, a speech is input to the speech input device and the controller allows the image forming device to be forming a different image other than the image representing the evacuation information, the controller allows the image forming device to stop the formation of the different image and form the image representing the evacuation information.

* * * * *